United States Patent [19]
Araki et al.

[11] Patent Number: 6,166,856
[45] Date of Patent: *Dec. 26, 2000

[54] SELF LIGHT-EMITTING RETROREFLECTIVE SHEET AND METHOD FOR PRODUCING THE SAME

[75] Inventors: Yoshinori Araki, Sagae; Hidetoshi Abe, Tendo; Kazumi Matsumoto, Sagamihara, all of Japan

[73] Assignee: 3M Innovative Properties Company, Saint Paul, Minn.

[*] Notice: This patent is subject to a terminal disclaimer.

[21] Appl. No.: 09/094,852

[22] Filed: Jun. 15, 1998

[30] Foreign Application Priority Data

Jun. 16, 1997 [JP] Japan .................................... 9-158419

[51] Int. Cl.⁷ .......................... G02B 7/180; G09F 13/20; G09F 13/22
[52] U.S. Cl. .......................... 359/627; 359/625; 40/542; 40/544
[58] Field of Search .................................... 359/625, 627; 40/542, 615, 544, 582

[56] References Cited

U.S. PATENT DOCUMENTS

| | | | |
|---|---|---|---|
| 2,568,126 | 9/1951 | Keeley | 40/615 |
| 2,910,792 | 11/1959 | Pfaff et al. | 40/582 |
| 3,924,929 | 12/1975 | Holmen et al. | 350/103 |
| 3,961,112 | 6/1976 | Genevitz et al. | 428/29 |
| 4,588,258 | 5/1986 | Hoopman | 359/530 |
| 4,637,950 | 1/1987 | Bergeson et al. | 428/168 |
| 4,774,435 | 9/1988 | Levinson | 313/509 |
| 4,775,219 | 10/1988 | Appeldorn et al. | 359/532 |
| 5,019,748 | 5/1991 | Appelberg | 315/169.3 |
| 5,045,755 | 9/1991 | Appelberg | 313/498 |
| 5,237,448 | 8/1993 | Spencer et al. | 359/792 |
| 5,243,457 | 9/1993 | Spencer | 119/795 |
| 5,300,783 | 4/1994 | Spencer et al. | 250/462.1 |
| 5,315,491 | 5/1994 | Spencer et al. | 362/84 |
| 5,415,911 | 5/1995 | Zampa et al. | 428/40 |
| 5,422,756 | 6/1995 | Weber | 359/487 |
| 5,698,301 | 12/1997 | Yonetani | 428/213 |
| 5,714,223 | 2/1998 | Araki et al. | 428/68 |
| 5,759,671 | 6/1998 | Tanaka et al. | 428/166 |
| 5,763,049 | 6/1998 | Frey et al. | 428/172 |
| 5,814,355 | 9/1998 | Shusta et al. | 425/373 |
| 5,828,488 | 10/1998 | Ouderkirk et al. | 359/487 |
| 5,905,099 | 5/1999 | Everarets et al. | 522/126 |
| 5,988,822 | 11/1999 | Abe et al. | 359/541 |
| 6,012,818 | 1/2000 | Araki | 359/529 |

FOREIGN PATENT DOCUMENTS

| | | |
|---|---|---|
| 59-14878 | 4/1984 | Japan . |
| 60-10013 | 6/1985 | Japan . |
| 62-59879 | 12/1987 | Japan . |
| 6-501111 | 2/1994 | Japan . |
| 7-218708 | 8/1995 | Japan . |
| 502131 | 3/1996 | Japan . |
| WO 92/14173 | 8/1992 | WIPO . |
| WO 94/21094 | 9/1994 | WIPO . |

OTHER PUBLICATIONS

"E–Lite's *Flatlite*® Flat Lamps", E–Lite Technologies, Inc., Brochure, 1997.

*Primary Examiner*—Georgia Epps
*Assistant Examiner*—Saeed Seyrafi
*Attorney, Agent, or Firm*—Doreen S. L. Gwin

[57] ABSTRACT

The present invention provides a self light-emitting retroreflective sheet including a light-transmitting retroreflective element including a plurality of prismatic projections, a lining film, and an electroluminescence device. The lining film includes a light-transmitting film which has sealing projections on one of its surfaces so that the prismatic projections are confined within a plurality of sealed cells formed by the sealing projections. In the sealed cells, a surface of the prismatic projections interface with air so as to increase light-emitting luminance and improve its uniformity.

8 Claims, 1 Drawing Sheet

SELF LIGHT-EMITTING RETROREFLECTIVE SHEET AND METHOD FOR PRODUCING THE SAME

FIELD OF THE INVENTION

The present invention relates to a self light-emitting retroreflective sheet and a method for producing the same. In particular, the present invention relates to a retroreflective sheet comprising an electroluminescence device (EL device) and a prismatic retroreflective element, and a method for producing the same.

BACKGROUND OF THE INVENTION

Prismatic retroreflective sheets such as cube-corner prismatic retroreflective sheets are used as displaying boards such as traffic signs or outdoor advertising signs, since they have higher reflection luminance and improve the visibility at night more effectively than glass beads type retroreflective sheets.

Now, the structures and functions of the prismatic retroreflective sheets will be explained briefly.

The prismatic retroreflective sheet comprises a retroreflective element having a main surface on which a plurality of prismatic projections are arranged, and a lining film made of a light-transmitting resin, and the retroreflective element and lining film are partly bonded so that minute sealed cells are formed between them. The surfaces of the prismatic projections are confined with having interfaces with an air, and the prisms having the interfaces with the air retroreflect the incident light at the high luminance. Sealing projections, which are partly bonded to the retroreflective element and form the sealed cells, are usually formed by embossing the resin film, which is a precursor of the lining film, from its back surface and protruding the surface side of the resin film.

However, such retroreflective sheets have their limit in improving the visibility at night in places where limited light sources such as head lamps of automobiles are available, for example, road sides having no lights nearby, since they are seen by viewers only when the sheets reflect the light which illuminates the sheet. That is, such sheets do not work sufficiently as the traffic or advertising signs which provide information to pedestrians at night in the above circumstances.

Thus, to solve such problems, several proposals have been made, for example, in JP-A-8-502131 (See, U.S. Pat. Nos. 5,315,491 and 5,300,783) and WO92/14173 (See, U.S. Pat. Nos. 5,243,457 and 5,237,448).

These patent publications disclose self light-emitting retroreflective sheets which comprise a cube-corner prismatic retroreflective element, and an EL device or a phosphorescence layer, and have a relatively thin thickness.

That is, the retroreflective sheets of the following types (a), (b) and (c) are disclosed:

(a) A retroreflective sheet comprising cube-corner prisms, and EL devices having transparent upper lids which are in close contact with prism projections on the outermost surfaces.

(b) A retroreflective sheet comprising cube-corner prisms which are confined in sealed cells under the condition that the surfaces of the prism projections have interfaces with an air, transparent adhesive layers which are filled in the cells in contact with the prism projections, and EL devices adhered to the back surfaces of the adhesive layers in the cells.

(c) A retroreflective sheet comprising cube-corner prisms, and EL devices provided in cells which confine the prism projections under the condition that the surfaces of the projections have interfaces with an air at certain distances from the prism projections.

The retroreflective sheet (a) emits light effectively when the EL device is lighted, but does not retroreflect the incident light since the surfaces of the prism projections have no interfaces with the air.

The retroreflective sheet (b) can emit light effectively in areas where the EL devices are in contact with the cube-corner prisms through the transparent adhesive layers, and it can retroreflect the incident light in areas where no EL device is present. However, the EL devices emit light in parts of the sheet surface having the cube-corner prisms, but do not emit light uniformly over the whole surface of the sheet.

The retroreflective sheet (c) can retroreflect the incident light over the whole surface of the sheet but the EL devices emit light in the parts of the sheet surface.

A retroreflective sheet in which a lining film emitting phosphorescence is provided on the back surface of a prismatic retroreflective element is known and disclosed in, for example, U.S. Pat. No. 5,415,911 and JP-A-7-218708. However, this sheet cannot emit the light as bright as the EL devices do.

SUMMARY

In the application of the retroreflective sheets in the field of traffic and advertising signs, it is one of the important objects to increase the luminance (self light-emitting luminance) of the retroreflective sheets, when the viewers having no light source observe the sheets in the circumstances where no retroreflection occurs, that is, the retroreflective sheets are not or little illuminated with the outside light source. However, the above conventional retroreflective sheets cannot increase the luminance of the EL device itself while maintaining the sufficient retroreflectivity of the sheets.

Thus, an object of the present invention is to provide a self light-emitting retroreflective sheet which has the sufficient retroreflectivity (reflection luminance), and increased light-emitting luminance so that its visibility at night is sufficient even when there is no outside light source and no retroreflection occurs.

To achieve the above object, one aspect of the present invention provides a self light-emitting retroreflective sheet 100 comprising:

A) a retroreflective member 10 comprising
   (i) a light-transmitting retroreflective element 1 having a substantially flat surface, and a back surface on which a plurality of prismatic projections are arranged, and
   (ii) a lining film 2 comprising a light-transmitting film, which is protruded by embossing and has, on its surface, sealing projections 21 that are partly bonded to said back surface of the retroreflective element 1 so that said prismatic projections are confined while the surfaces of the prismatic projections have interfaces with an air and form a plurality of sealed cells 23, and B) an electroluminescence device 3 which has a substantially flat light-emitting surface 31 extending substantially the whole area of the back surface of said lining film 2, wherein said sheet further comprises a light-transmitting contact layer 4 which fills depressions 22 formed by the embossing on the back surface of the lining film 2 and is bonded to substantially the whole area of the back surface of the lining film, and also to substantially the whole area of the light-emitting surface 31 of the electroluminescence element 3.

Preferably, the light-transmitting retroreflective element 1 has a light transmission of at least 70%, the lining film 2 has a light transmission of at least 20%, and the contact layer 4 has a light transmission of at least 30%.

The self light-emitting retroreflective sheet of the present invention may further include a protective film 5 on the substantially flat surface of the light-transmitting retroreflective element 1.

Preferably, the sealing projections 21 that are partly bonded to said back surface of the retroreflective element 1 form an adhesion area of about 10% to about 85% of the whole back surface of the retroreflective element 100.

Another aspect of the present invention provides a method for producing a self light-emitting sheet as described above. Preferably, the method includes the steps of placing a resin film which is a precursor of the lining film 2 with its surface facing the back surface of the retroreflective element 1 with leaving a specific distance from the back surface of the retroreflective element 1, embossing said resin film from its back surface to protrude its surface partly and form sealing projections 21 which bond to the back surface of said retroreflective element 1, whereby the retroreflective member 10 having a plurality of sealed spaces 23 is formed, forming a coated layer having a substantially flat liquid surface by applying a polymerizable liquid onto the back surface of said lining film 2 and filling the depressions 22 formed by embossing, polymerizing said coating liquid and forming a contact layer 4 having the substantially flat surface which is formed from said substantially flat liquid surface and bonded to said lining film 2, and placing an electroluminescence element 3 on the substantially flat surface of the contact layer 4 so that its light-emitting surface 31 is in contact with the contact layer 4.

DETAILED DESCRIPTION

Figure 1:
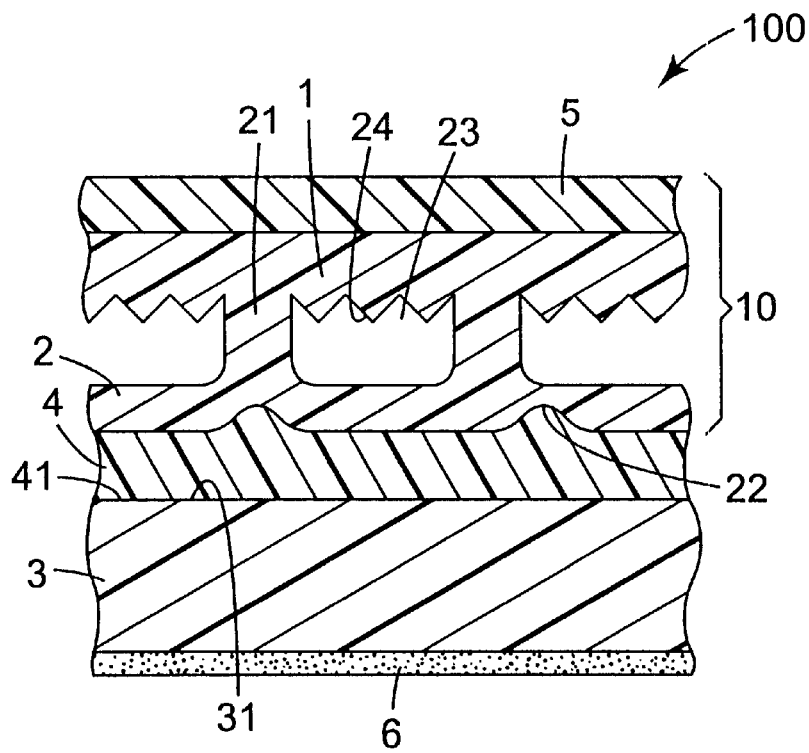
FIG. 1 is a cross sectional view of an example of the retroreflective sheet according to the present invention.

In the retroreflective sheet 100 of the present invention, the contact layer 4 bonds the EL device 3 and the lining film 2 all over their surfaces so that no voids formed by the depressions 22 corresponding to the embossed marks remain between the substantially flat light-emitting surface 31 of the EL device 3 and the back surface of the lining film 2.

If such voids remain, the aerial interfaces are formed between the EL device 3 and the lining film 2 and reflect the light from the EL device. Thus, the amount of light which reaches the lining film 2, that is, the retroreflective member 1, decreases. The retroreflective sheet of the present invention can decrease the amount of light reaching from the EL device 3 to the retroreflective member 10 due to the reflection at the aerial interfaces, and the light-emitting luminance can be increased.

When the transparent conductive layer is bonded directly to the back surface of the lining film 2, and thus the transparent conductive layer having dents corresponding to the depressions 22 is formed, the light-emitting layer which is formed in close contact to such the transparent conductive layer tends to have an irregular thickness, and the thickness of the light-emitting layer decreases the luminescent efficiency. The contact layer 4 effectively prevents the decrease of luminescent efficiency and also the decrease of the light-emitting luminance.

The prismatic retroreflective element 1 (sometimes referred to as "retroreflective element") retroreflects the incident light with a high luminance at a plurality of sealed minute cells which are formed to confine the prismatic projections under the condition that the surfaces of the projections have interfaces with an air.

The retroreflective member allows the transmission of the light emitted from the EL devices through the whole retroreflective element 1 (that is, the areas to which the sealing projections 21 are bonded and the areas having the sealed cells), and the whole surface of the sheet emits light, since the sealing projections have light-transmitting properties.

The contact layer, lining film and retroreflective element are formed from light-transmitting materials. The light transmission of the laminate of these three members is usually at least 30%, preferably at least 40%, more preferably at least 45%.

The uniformity of the luminance can be improved when at least one of the contact layer, lining film and retroreflective element contains diffusively reflecting particles and the light transmission of the laminate is preferably between 30 and 70%, more preferably between 40 and 65%. When it is desired to improve the effect for increasing the luminance of light emitted from the EL device rather than the uniformity of the luminance of diffused light, the light transmission of the laminate is preferably at least 70%, in particular at least 80%. The light transmission of the laminate is the transmission of light which propagates from the contact layer side to the retroreflective element.

Herein, the "light transmission" means a transmission of light measured with light of 550 nm using a UV-light/visible light spectrophotometer "U Best V-560" manufactured by Nippon Bunko Kabushikikaisha.

The light transmission of each of the above three members is selected so that the laminate of the three members has the light transmission in the above range. In general, the retroreflective element is made of a material having a light transmission of at least 70%, the lining film is made of a material having a light transmission of at least 20%, and the contact layer is made of material having a light transmission of at least 30%. Thus, the laminate of the three members has a light transmission of at least 30%.

The light transmission of the retroreflective element is the transmission of light propagating from the back surface to the surface.

Almost all the surface of the retroreflective element can be substantially flat, since the sealing projections for forming the sealed cells are bonded to the back surface of the retroreflective element. When almost all the surface of the retroreflective element is substantially flat, the displays can be easily provided on the surface by conventional printing methods. That is, the retroreflective sheet of the present invention is preferably used as a member of a retroreflective sign.

The retroreflective sheet of the present invention may be produced by various methods. Preferably, it is produced by the method comprising the steps of:

I) placing a resin film which is a precursor of the lining film 2 with its surface facing the back surface of the retroreflective element 1 with leaving a specific distance from the back surface of the retroreflective element 1, II) embossing said resin film from its back surface to protrude its surface partly and form sealing projections 21 which bond to the back surface of said retroreflective element 1, whereby the retroreflective member 10 having a plurality of sealed spaces 23 is formed, III) forming a coated layer having a substantially flat liquid surface by applying a polymerizable liquid onto the back surface of said lining film 2 and filling the depressions 22 formed by embossing, IV) polymerizing said coating liquid and forming a contact layer 4 having the substantially flat surface which is formed from said substantially flat liquid surface and bonded to said lining film 2, and V) placing an electroluminescence element 3 on the substantially flat surface of the contact layer 4 so that its light-emitting surface 31 is in contact with the contact layer 4.

This preferable method can surely fill the depressions 22 and readily form the structure in which the lining film 2 and the EL device are bonded to the contact layer 4.

A preferred embodiment of the retroreflective sheet of the present invention will be explained by making reference to FIG. 1.

The retroreflective sheet 100 comprises a prismatic retroreflective member 10, an EL device 3, and a contact layer 4 interposed between them.

The prismatic retroreflective member 10 comprises (i) a light-transmitting retroreflective element 1 having a substantially flat surface and a back surface on which a plurality of prismatic projections are arranged, and (ii) a lining film 2 made of a light-transmitting resin. The element 1 and the lining film 2 are partly bonded so that a plurality of minute sealed cells 23 are formed.

The surfaces of the prismatic projections 24 are confined while they have interfaces with an air. The sealing projection 21 are formed by protruding the surface of the resin film which is a precursor of the lining film 2 by embossing the film from its back surface, and partly bonded to the retroreflective element 1. Thus, the back surface of the lining film 2 has depressions corresponding to the marks formed by embossing.

The EL device 3 is provided so that the light-emitting surface 31 extends over substantially the whole back surface of the lining film 2. The details of the EL device will be explained below.

The contact layer 4 bonds to substantially the whole back surface of the lining film 2 while filling the depressions 22, and also the flat surface 41 of the contact layer 4 bonds to substantially the whole light-emitting surface 31 of the EL device 3.

The retroreflective element 10 may optionally have a protective film 5 which is laminated on the surface of the retroreflective element 1. Furthermore, an adhesive layer 6 may be provided on the back surface of the EL device 3, that is, the surface opposite to the light-emitting surface 31, in order to facilitate the adhering of the retroreflective sheet 100 to a substrate such as an aluminum sign board.

The retroreflective sheet of the present invention may be produced by forming the contact layer on the back surface of the retroreflective member which has been formed (after embossing), forming the transparent conductive layer on the contact layer, and providing the EL device on the contact layer by laminating elements of the EL device such as the luminescent layer and the like on the transparent conductive layer. In this case, the surface of the transparent conductive layer (the surface bonded to the contact layer) forms the light-emitting surface. Alternatively, the back surface of the lining film of the finished retroreflective member and the light-emitting surface of the finished EL device are adhered through the contact layer.

Prismatic Retroreflective Element

The prismatic retroreflective element is made of a resin having the light transmission of usually at least 70%, preferably at least 80%, in particular at least 90%. This type of prismatic retroreflective element can realize the high reflection luminance without the use of any metal reflection film which decreases transparency of the retroreflective element, and can increase the luminance over the whole surface uniformly by the synergistic effect of the emission from the EL device and the retroreflection.

This type of prismatic retroreflective sheet may be produced by the methods disclosed in JP-A-60-100103, JP-A-6-50111, U.S. Pat. No. 4,775,219 and the like. For example, a plastic material is molded using a mold having a specific shape and arrangement.

A preferred shape of the prismatic projection is a trigonal pyramid which is called as a cube-corner. The cube-corner can increase the reflection luminance and the wide angle observation of the retroreflective element.

The preferred sizes of a trigonal pyramid are between 0.1 and 3.0 mm in one side of the bottom triangle and between 25 and 500 $\mu$m in height. The bottom triangle may be an equilateral or isosceles triangle.

The resin, which forms the retroreflective element, is preferably a highly transparent one having a refractive index of between 1.4 and 1.7. Examples of such resin are acrylic resins, epoxy-modified acrylic resins, polycarbonate resins, and the like. This resin may contain additives such as UV light absorbers, moisture absorbents, colorants (including fluorescent dyes), phosphors, heat-stabilizers, fillers, and the like, unless the effects of the present invention are impaired.

Lining Film

The lining film is made of a resin having the light transmission of at least 20%, preferably at least 30%.

The light transmission of the lining film is between 20 and 80%/, preferably between 25 and 75%, when the lining film functions as the light-diffusing member.

The light transmission of the lining film is preferably at least 80%, more preferably at least 90%, when improvement of the luminance caused by the mission from the EL device is sought rather than the uniformity of the luminance due to the diffused light.

Examples of the resin film are those of polyester resins, acrylic resins, polyurethane, vinyl chloride resins, polycarbonate, polyamide, polyvinyl fluoride, polyvinylidene fluoride, polybutyrate, and the like. This resin film may contain additives such as UV light absorbers, moisture absorbents, colorants (including fluorescent dyes), phosphors, heat-stabilizers, diffusively reflecting particles, and the like, unless the effects of the present invention are impaired. Examples of the diffusively reflecting particles are white inorganic particles such as titanium dioxide; polymer particles such as polystyrene particles; and the like.

The thickness of the lining film is usually in the range between 10 and 1000 $\mu$m. The softening point of the film is preferably in the range between 80 and 250° C.

The resin film may be produced by, for example, extrusion. The resin film may be a multi-layer film having two or more layers, unless the effects of the present invention are impaired.

Production of Retroreflective Member

The retroreflective member is produced by placing the resin film which is the precursor of the lining film with its surface facing the back surface of the retroreflective element with leaving a specific distance from the back surface of the retroreflective element, and embossing the lining film from its back surface. The embossing protrudes the surface of the resin film partly and forms the sealing projections which are bonded to the back surface of the retroreflective element. Thus, a plurality of sealed cells are formed. The temperature for embossing is usually above the softening point of the lining film, preferably between 100 and 300° C.

The area of one minute cell (the area of one part surrounded by the sealing projections) is preferably between 2.5 and 40 mm$^2$, in particular, between 5 and 30 mm$^2$. When the area of one minute cell is less than 2.5 mm$^2$, the reflection luminance is insufficient. When the area of one minute cell exceeds 40 mm$^2$, the prismatic projections tend to be broken, the sheet is wrinkled, or the sheet appearance is damaged by wind or impact.

The total adhesion area of the sealing projections viewed from the surface of the retroreflective element is between 10 and 85%, preferably between 20 and 70%, in particular between 30 and 60% of the whole back surface of the retroreflective element.

When the total adhesion area exceed 85%, the retroreflective luminance tends to decrease. When the total adhesion area is less than 10%, the adhesion strength decreases and the lining film tends to be peeled off from the retroreflective element. The total adhesion area is increased to decrease the above area of one cell.

The total adhesion area of the sealing projections can be increased up to 70% to achieve the improvement of luminance due to the light emitted from the EL device when the lining film is the translucent film having the diffusion properties.

The protective film 5 laminated on the surface of the retroreflective element 1 is preferably a transparent plastic film containing a UV light absorber for further improving the outdoor weatherability of the retroreflective sheet. Such transparent film may be made of plastics such as acrylic polymers, polymer blends of acrylic polymer and polyvinylidene fluoride, and the like.

Such retroreflective member may be formed by the methods disclosed in JP-A-60-100103, JP-A-6-50111, U.S. Pat. No. 4775219, and the like.

EL Device

The EL device has the laminate structure of the transparent conductive layer, rear electrode and luminescent layer which is interposed between them. A light-transmitting (non-conductive) film may be optionally laminated on the surface of the transparent conductive layer. The light-emitting surface may be the surface of the transparent conductive layer or light-transmitting film. Such the surface is flat. An insulating layer may be provided between the luminescent layer and rear electrode, if necessary. These components are preferably bonded without leaving an air layer between them.

For effectively increasing the luminance over the whole surface of the sheet, the self light-emitting luminance is preferably at least 13 cd/m$^2$ when the EL device alone is lighted.

Transparent Conductive Layer

The transparent conductive layer may be formed by coating it directly on the substantially flat surface of the contact layer formed on the back surface of the lining film. The contact layer will be explained in detail below.

The transparent conductive film may be any transparent electrode such as an ITO (Indium-Tin Oxide) film, and the like. The thickness of the transparent conductive film is usually between 0.01 and 1000 μm, and the surface resistivity is usually 500 Ω/square or less, preferably about 1 and 300 Ω/square. The light transmission is usually at least 70%, preferably at least 80%. The ITO film is formed by any conventional film-forming method such as vapor deposition, sputtering, paste coating, and the like.

The transparent conductive layer and contact layer can be bonded after the formation of the transparent conductive layer on the surface of the luminescent layer. Alternatively, the transparent conductive layer may be omitted, and the luminescent layer may be formed directly on the flat surface of the contact layer when the contact layer has sufficient conductivity.

A laminate of a light-transmitting film and a transparent conductive film can be used as the transparent conductive layer. In this case, the transparent conductive layer is provided with the conductive film facing the luminescent layer.

Examples of the light-transmitting film are films of plastics such as polyethylene terephthalate.

The light transmission of the film is usually at least 70%, and the thickness of the film is usually between 10 and 1000 μm. The light-transmitting film may contain a fluorescent dye which develops a complimentary color to the color of light emitted by the luminescent layer, and thereby the EL device which emits white light can be formed.

Rear Electrode

The rear electrode 34 is placed on the back surface of the luminescent layer, that is, the surface opposite to the transparent conductive layer 30. The rear electrode is usually in direct contact with the luminescent layer. When the insulating layer is present in contact with the back surface of the luminescent layer, the rear electrode is provided so that it is in contact with the insulating layer.

The rear electrode may be a conductive film used in the conventional dispersions type EL devices, such as a metal film of aluminum, gold, silver, copper, nickel, chromium, etc.; a transparent conductive film such as an ITO film; a conductive carbon film; and the like. The metal film may be a vapor deposited film, sputtered film, metal foil, and the like.

The thickness of the rear electrode is usually between 5 nm and 1000 μm.

Luminescent Layer

The luminescent layer may be formed as follows:

The matrix resin comprising the polymer with the high dielectric constant, fluorescent particles and solvent are mixed and dispersed homogeneously with a kneading apparatus such as a homomixer, and a paint for the dispersion type luminescent layer is prepared. Then, it is coated and dried for forming the luminescent layer. In this case, the paint may be applied directly on the transparent conductive layer, rear electrode or insulating layer. Alternatively, the luminescent layer may be formed on a temporal support having releasing properties, and then transferred to the transparent conductive layer, rear electrode or insulating layer. The solid content of the paint is usually between 10 and 60 wt. %.

The fluorescent particles are contained in an amount of between 50 and 200 wt. parts per 100 wt. parts of the matrix resin.

The fluorescent particles may contain two or more kinds of particles. For example, at least two kinds of luminescent particles which emit blue, blue-green or orange light and have discrete spectra each other are mixed, and a white luminescent layer can be formed. Alternatively, the luminescent layer comprises two or more sublayers which contain particles emitting different colors.

The coating means, coating thickness, drying conditions, and the like are the same as those in the formation of the conventional dispersion type luminescent layer (see JP-B-59-14878, JP-B-62-59879, etc.).

The laminated luminescent layer 32 (that is, the laminate structure consisting of the support layer 38, luminescent particle layer 37 and insulating layer 36) may be formed as follows:

Firstly, a paint for forming the support layer is applied on the transparent conductive layer. Then, the luminescent particle layer is formed on the surface of the support layer by any conventional powder coating method prior to the drying of the paint. After that, the particles are partly embedded in the support layer, and the support layer is dried. Thereby, the support layer and particle layer are bonded together. Finally, the insulating layer is laminated on the luminescent particle layer and the laminate structure having the bonded layers is formed. The insulating layer can be formed by applying a paint containing materials for forming the insulating layer and drying it.

The luminescent particle layer consists of a plurality of particles, which are placed in a single layer state, and is bonded to both the support and insulating layers. The support layer and/or insulating layer may be a laminate having two or more layers, unless the effects of the present invention are impaired.

Support Layer for Luminescent Layer

The support layer is a transparent layer containing a matrix resin. The thickness of the support layer is usually between 5 and 1000 $\mu$m, and the light transmission is usually at least 70%, preferably at least 80%.

The matrix resin may be a resin which is used in the conventional dispersion type EL devices such as epoxy resins, polymers having a high dielectric constant, and the like. The polymers having the high dielectric constant are those having a dielectric constant of usually at least about 5, preferably between 7 and 25, more preferably between 8 and 18, when it is measured by applying an alternating current of 1 kHz. When the dielectric constant is too low, the luminance may not increase. When it is too high, the life of the luminescent layer tends to shorten.

Examples of the polymers having the high dielectric constant are vinylidene fluoride resins, cyanoresins, and the like. For example, the vinylidene fluoride resin may be obtained by copolymerization of vinylidene fluoride and at least one other fluorine-containing monomer. Examples of the other fluorine-containing monomer are tetrafluoroethylene, trifluorochloroethylene, hexafluoropropylene, and the like. Examples of the cyanoresin are cyanoethylcellulose, cyanoethylated ethylene-vinyl alcohol copolymer, and the like.

The support layer consists of the matrix resin in general, while it may contain additives such as other resins, fillers, surfactants, UV light absorbers, antioxidants, antifungus agents, rust-preventives, moisture absorbents, colorants, phosphors, and the like, unless the effects of the present invention are impaired.

For example, when the emitted light from the luminescent particle layer is blue-green, the matrix resin contains red or pink fluorescent dyes such as rhodamine 6G, rhodamine B, perylene dyes, etc., or processed pigments formed by dispersing such the dyes in a resin, and the white luminescent layer is formed.

Insulating Layer for Luminescent Layer

The insulating material contained in the insulating layer for the luminescent layer may be insulating particles, polymer having a high dielectric constant, and the like, which are used in the conventional dispersion type EL devices. Examples of the insulating particles are inorganic insulating particles of, for example, titanium dioxide, barium titanate, aluminum oxide, magnesium oxide, silicon oxide, silicon nitride, and the like. The polymers having the high dielectric constant may be the polymers used for the support layer.

The insulating layer may be formed by coating the paint on either the rear electrode or the luminescent particle layer.

When the insulating layer is the coated layer comprising the insulating particles and the polymer having the high dielectric constant, the amount of the insulating particles is between 1 and 400 wt. parts, preferably between 10 and 300 wt. parts, more preferably between 20 and 200 wt. parts, per 100 wt. parts of the polymer having the high dielectric constant. When the amount of the insulating particles is too low, the insulating effect decreases, and thus the luminance tends to decrease. When the amount is too high, the application of the paint may be difficult.

The thickness of the insulating layer is usually between 5 and 1000 $\mu$m. The insulating layer may contain additives such as fillers, surfactants, antioxidants, antifungus agents, rust-preventives, moisture absorbents, colorants, phosphors, curable resins, tackifiers, and the like, insofar as the insulating properties are impaired.

Luminescent Particle Layer

The luminescent particles in the luminescent particle layer may be fluorescent particles which are used in the conventional dispersion type EL devices. Examples of the fluorescent materials are single substances of fluorescent compounds (e.g., ZnS, CdZnS, ZnSSe, CdZnSe, etc.), or mixtures of the fluorescent compounds and auxiliary components (e.g., Cu, I, Cl, Al, Mn, NdF$_3$, Ag, B, etc.).

The average particle size of the fluorescent particles is usually between 5 and 100 $\mu$m. The particulate fluorescent materials on which a coating film of glass, ceramics, and the like is formed may be used.

The content of the luminescent particles in the luminescent particle layer is preferably at least 40 wt. %. When the content is less than 40 wt. %, the effects for improving the luminance may decrease.

The thickness of the luminescent particle layer is usually between 5 and 500 $\mu$m. When the fluorescent particle layer consists of a plurality of particles which are placed in a single layer state, the EL device can be made thin easily.

Furthermore, the luminescent particle layer may contain at least two kinds of luminescent particles.

The luminescent particle layer may contain one or more kinds of particles other than the luminescent particles, for example, coloring materials, phosphors, polymers, inorganic oxides, and the like. The luminance can be maximized when the particles consist of the luminescent particles. For example, luminescent particles which emit blue-green light and pink coloring materials having the complimentary color relationship with blue-green (for example, particles containing rhodamine 6G, rhodamine B, etc.) are mixed, and the white luminescent layer is formed.

The contact layer can be formed by applying a polymerizable liquid containing polymerizable monomers or oligomers on the back surface of the lining film and polymerizing it. The liquid containing the monomer or oligomer has the sufficiently low viscosity; it can fill the depressions surely.

The viscosity of the polymerizable liquid (at 25° C.) is usually between 1 and 100,000 centipoise, preferably between 5 and 80,000 centipoise, in particular between 10 and 50,000 centipoise. When the viscosity is too low, the contact layer having the sufficient thickness cannot be formed, and the bonding properties tend to deteriorate. When the viscosity is too high, the depressions may not be filled surely.

Herein, the viscosity of the liquid is measured using a Brookfield type viscometer with the No. 2 rotor at 60 rpm.

Alternatively, a primer is first coated on the back surface of the lining film, and then the polymerizable liquid is applied.

The unpolymerized contact layer (coated layer) is formed in a thickness such that the depressions are filled, and the substantially flat liquid surface is formed. When the thickness of the coated layer is too thin, the bonding properties of the contact layer to the EL device and lining film tend to deteriorate. The thickness of the contact layer (a distance from the back surface of the lining film except the depressions to the flat surface of the contact layer) is usually between 1 and 100 $\mu$m.

The liquid surface of the coated layer formed on the back surface of the lining film is flattened prior to the provision of the EL device (or the transparent conductive layer). For example, the liquid surface may be flattened by allowing a flat release surface of a release film in contact with the surface of the polymerizable liquid which has been applied on the back surface of the lining film, and casting the liquid while pressurizing it through the release film so that the coated layer is formed. The pressurization facilitates the filling of the depressions with the liquid. The pressurization may be carried out by passing the laminate of the retroreflective member, coated layer and release film between a pair of pressure rolls. During the pressurizing step, the laminate may be heated. It is preferable to laminate another release film on the surface side of the retroreflective member for protecting the surface of the retroreflective member and then to pressurize the laminate.

The coated layer can be photopolymerized when the release film covering the coated layer is a highly transparent film such as films of PET, polypropylene, polyethylene, and the like. Rays used for photopolymerization may be UV rays, electron beams, visible light, far infrared rays, and the like. A dose of the ray to be irradiated is selected at a level at which the contact layer is sufficiently solidified, and the lining film and EL device can be bonded without delamination. For example, in the case of UV rays, the dose is between 1 and 10 $J/cm^2$.

Then, the release film is removed from the substantially flat surface of the formed contact layer and the EL device is placed on the substantially flat surface with bonding the light-emitting surface of the EL device to the substantially flat surface. For example, the EL device can be formed by forming the transparent conductive layer, which is in contact with the contact layer, and then successively laminating the elements of the EL device, such as the luminescent layer on the transparent conductive layer.

In addition to the coating method using the rolls as described above, the coated layer prior to the polymerization may be applied by methods using knifes, bars, dies, and the like. It is not necessary to use the release film when the surfaces of tools such as the rolls, bars, and the like have sufficient releasing properties.

Alternatively, the contact layer which is bonded to both the lining film and EL device may be formed by polymerizing the coated layer with allowing the transparent conductive layer or the light-transmitting film having the transparent conductive layer in contact with the liquid surface of the coated layer.

The monomer or oligomer contained in the above polymerizable liquid may be a polymerizable compound such as (meth)acrylates, epoxy compounds, cyanoacrylate compounds, and the like.

Preferably, the (meth)acrylates substantially comprise polyfunctional acrylate compounds, since the crosslinking density of the contact layer after the polymerization increases, the dimensional stability over time improves, and the peeling of the contact layer caused by its contraction or expansion can be prevented effectively.

The polymerizable liquid may contain various additives, if desired. For example, photopolymerization initiators may be added for increasing the reactivity. Coupling agents such as silane coupling agents may be added for improving the adhesion properties. The coupling agent may be contained in an amount of between 0.1 and 10 wt. parts per 100 wt. parts of the polymerizable compound. Furthermore, inorganic colloidal particles such as antimony pentoxide, zirconia, and the like may be added for increasing the refractive index of the contact layer. Other additives such as diffusively reflecting particles, conductive particles, surfactants, UV light absorbers, antioxidants, antifungus agents, rust preventives, moisture absorbents, colorants (including fluorescent dyes), phosphors, and the like may be added, unless the effects of the present invention are impaired.

The term "polymerizable" includes "curable" and "crosslinkable" as the synonyms. The polymerizable liquid may be a heat-curable or moisture-curable one.

The contact layer may be formed from a non-polymerizable polymer, unless the effects of the present invention are impaired. Furthermore, the contact layer may include a plurality of light-transmitting layers.

Application of Retroreflective Sheet

The retroreflective sheet of the present invention is adhered to a sign board substrate through the adhesive provided on the back surface of the EL device, and used for forming a retroreflective sign board. Examples of such an adhesive are acrylic, polyurethane and epoxy resin adhesives.

When the EL device having the white luminescent layer is used, the whiteness of background for the signs formed on the surface of the retroreflective sheet increases. Thereby, the visibility becomes the same level between in the daytime and at night. The visibility at night does not change substantially whether the EL device is on or off. Furthermore, the appearance of the sign formed with transparent inks is improved.

The EL device can emit light when joining a pair of terminal, which have been connected to the transparent conductive layer and rear electrode, respectively, to a power source and applying a voltage to the device. As the power source, cells such as dry cells, batteries, solar cells, etc. may be used, or an alternating current is supplied to the EL device from a power line through an inverter, which alters the voltage or frequency, or changes the current between the alternating current and the direct current. The frequency of the alternating current is usually between 50 and 1000 Hz. The applied voltage is usually between 3 and 200 V. The laminate type EL device has the high light-emitting efficiency, and therefore emits light at a lower voltage than that necessary for the conventional dispersion type ones.

Examples

Example 1

Figure 2:
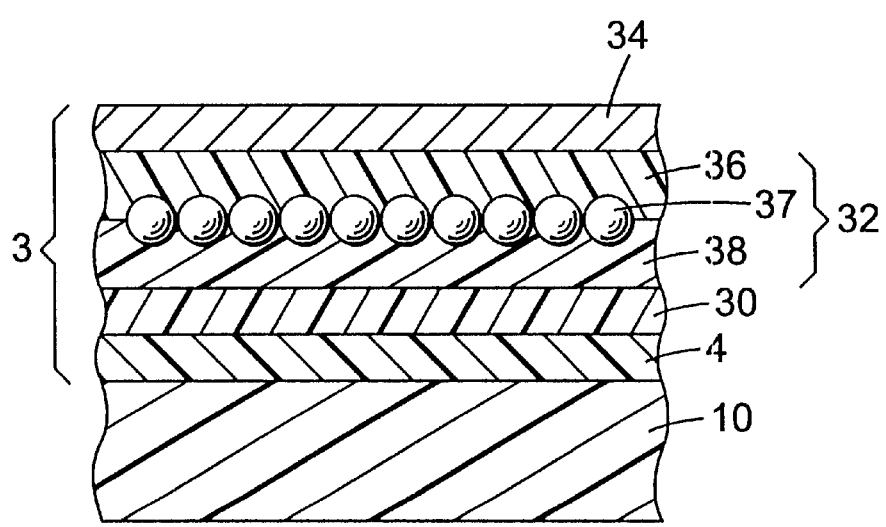
FIG. 2 is a cross sectional view of an example of the laminate EL device which is used in the retroreflective sheet according to the present invention.

This non-limiting example illustrates a retroreflective sheet comprising the laminate type El device 3 having the structure of FIG. 2, and a retroreflective member 10 having the structure of FIG. 1, which are bonded through the contact layer 4.

Production of Retroreflective Member

A resin film, which is a precursor of a lining film, was placed above a back surface (having cube-corner prisms) of a cube-corner retroreflective element having the light transmission from the back surface of 100%, at a certain distance with the surface of the film facing the back surface of the retroreflective element, and embossed to form sealing projections. Thus, a retroreflective member having a plurality of minute sealed cells was obtained. The temperature of an embossing roll was 260° C., and a nip pressure was 4.2 kg/cm².

The above retroreflective element was molded from a polycarbonate resin according to the method disclosed in JP-A-6-501111. The resin film was made of a transparent polyester having a light transmission of 90.2%.

Shapes of a plurality of cells were substantially the same and all squares, when viewed from the surface of the retroreflective element, and an area of one cell (an area surrounded by the sealing projections when viewed from the surface of the member) was 10 mm². The total area occupied by the sealing projections was 38% of the whole back surface of the retroreflective element.

Then, a colorless transparent film of polymethyl methacrylate of the impact resistant grade as a top film (a protective film) was fusion bonded to the surface of the retroreflective element for improving the outdoor weatherability. The whole light transmission of the laminate of the above three component layers from the lining film side was 89.5%, and the total thickness was about 300 μm.

Formation of Contact Layer

The polymerizable liquid having the following composition was applied on the back surface of the lining film of the above retroreflective member, and a coated layer which filled the embossing marks (depressions) and had a flat liquid surface was formed by the following method:

| Composition of Polymerizable Liquid | |
|---|---|
| Hydantoin hexaacrylate | 58 wt. % |
| 1,6-Hexanediol diacrylate | 38 wt. % |
| Irgagure 651 (photopolymerization initiator) | 2 wt. % |
| Silane coupling agent ("KBM-603" available from Shinetsu Silicone) | 2 wt. % |

Firstly, the polymerizable liquid (viscosity of 205 centipoise) was supplied on one edge of the back surface of the lining film, and the retroreflective member was interposed between a pair of PET release films and passed between a pair of rolls from the edge carrying the polymerizable liquid to the opposite edge. Thus, the polymerizable liquid was cast over the back surface of the lining film.

After that, the coated layer of the polymerizable liquid was polymerized, and the contact layer, which was bonded to the lining film and had a flat surface formed from the liquid surface, was formed.

The coated layer was polymerized by irradiating UV light through the release PET film. The light source was a high pressure mercury lamp available under the designation JP-200-EXC from ORC Kabushikikaisha, the irradiation time was about 3 minutes, and the total dose was about 3.8 J/cm².

After polymerization, the PET release films were peeled off.

The thickness of the contact layer (the distance from the back surface (except the depressions) of the lining film to the flat surface of the contact layer) was about 10 μm. The light transmission of the laminate of the contact layer and retroreflective member from the contact layer side was 86.5%.

Lamination of EL Device

On the flat surface of the contact layer of the laminate which had been formed as above, a transparent conductive layer, luminescent layer (having a support layer, luminescent particle layer and insulating layer), and rear electrode were laminated in this order with these layers being bonded, by the following procedures, and an EL device was assembled.

Accordingly, a retroreflective sheet of this Example was obtained, which comprised the retroreflective member and the EL device the light-emitting surface of which was bonded to the flat surface of the contact layer was obtained.

A transparent conductive layer of ITO (indium-tin oxide) was laminated by sputtering. The thickness of the ITO layer was 100 nm, and the surface resistivity was 90 Ω/square.

Separately, a paint for forming a support layer was prepared by mixing and uniformly dissolving a polymer having a high dielectric constant (a tetrafluoroethylene-hexafluoropropylenevinylidene fluoride copolymer available under the trade designation THV 200 P from Dyneon, St. Paul, MN, having a dielectric constant of 8 (at 1 kHz) and a light transmission of 96%) in ethyl acetate with a homo-mixer. The solid content of the paint was about 25 wt. %.

The paint for forming the support layer was applied on the ITO layer. Then, luminescent particles were scattered over the applied paint substantially in the single layer state prior to drying of the paint and embedded in the paint so that about 50% of the diameter sunk. After that, the paint was dried. The paint was applied with a knife coater, and the particles were scattered immediately after the application of the paint. The drying conditions included a temperature of about 65° C. and a drying time of about one minute. The total dry thickness of the support layer and luminescent particle layer was 40 μm. The luminescent particles were ZnS luminescent particles (trade designation: S-728 manufactured by Osram Sylvania; average particle size, about 23 μm).

Next, a paint for forming an insulating layer was applied so that the paint covered the luminescent particle layer and dried, and an insulating layer was formed. Thereby, a bonded structure was formed, in which the luminescent particle layer was embedded both in the support and insulating layers and substantially no bubbles were present at interfaces between each pair of layers.

The paint for forming the insulating layer was prepared in the same manner as that for the paint for forming the support layer except that a polymer having a high dielectric constant (THV 200 P described above), insulating particles (barium titanate manufactured by Kanto Kagaku) and ethyl acetate were mixed. The weight ratio of the polymer to the insulating particles was 100:80, and the solid content of the paint was about 38 wt. %. The paint was applied with a knife coater, and the drying conditions included a temperature of about 65° C. and a drying time of about one minute. The dry thickness of the laminate of the support layer, luminescent particle layer and insulating layer was 45 μm.

Finally, a rear electrode layer made of aluminum was laminated on the insulating layer by vacuum deposition, and a film-form EL device of the present invention was obtained. In this step, the vacuum deposition was carried out using a vacuum deposition apparatus designated EBV-6DA (manufactured by Ulvac) under reduced pressure of $10^{-5}$ Torr or less for 5 seconds.

Light Emission from EL Device

Respective terminals were attached to the transparent conductive layer and rear electrode layer of the EL device of this Example which had been prepared by cutting the sheet-from device in a square of 100 mm×100 mm, and connected to a power source (trade designation: PCR 500L manufactured by Kukusui Electronic Industries, Ltd.). Then, the alternating voltage was applied to the device under conditions of 120 V, 600 Hz. The light was emitted brightly and uniformly all over the light-emitting surface of the sheet.

The luminance (self light-emitting luminance) was measured, and the result is shown in Table 1. The luminance was measured by placing the retroreflective sheet in a dark room and measuring a luminance at a distance of 1 meter from the surface of the top film using a luminance meter (trade designation: LS 110 manufactured by Minolta).

Retroreflective Reflection Luminance

The reflection luminance of the retroreflective sheet of this Example was measured when the EL device was off, according to JIS Z 8714 using an apparatus designated Model 920 manufactured by Gamma Scientific. The result is shown in Table 1.

The result showed that the retroreflective sheet of this Example achieved the sufficiently high retroreflective reflection luminance.

Comparative Example 1

A retroreflective sheet of this Comparative Example was produced in the same manner as in Example 1 except that no contact layer was formed, and its self light-emitting luminance and reflection luminance were measured in the same manners as in Example 1. The results are shown in Table 1.

Comparative Example 2

A retroreflective sheet of this Comparative Example was produced in the same manner as in Example 1 except that no contact layer was formed, and the ITO layer was formed by coating the following paste.

The ITO paste used in this Comparative Example was that available under the trade designation SC-100 manufactured by Tohoku Kako. This paste was coated on the back surface of the lining film with a bar coater and dried, and an ITO layer was formed.

The ITO layer formed by this method could not fill the depressions on the back surface of the lining film and many voids formed from the depressions remained.

A self light-emitting luminance and reflection luminance of this retroreflective sheet were measured in the same manners as in Example 1. The results are shown in Table 1.

TABLE 1

Light Emitting Luminance and Reflection Luminance of Retroreflective Sheets

| Example | Light-Emitting Luminance With EL Device Being On (cd/m$^2$) | Reflection Luminance With EL Device Being Off (cd/lux/m$^2$) |
| --- | --- | --- |
| Ex. 1 | 33.77 | 543 |
| C. Ex. 1 | 11.73 | 546 |
| C. Ex. 2 | 9.66 | 541 |

The present invention provides a self light-emitting retroreflective sheet which has a sufficient retroreflective reflection luminance (for example, 500 cd/lux/m$^2$), and a light-emitting luminance which is increased to a level where the visibility at night is sufficient even when no external light source is available, and no retroreflection occurs.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A self light-emitting retroreflective sheet comprising:

a retroreflective member comprising
  (i) a light-transmitting retroreflective element having a substantially flat surface, and a back surface on which a plurality of prismatic projections are arranged, and
  (ii) a lining film comprising a light-transmitting film, which is protruded by embossing and has, on its surface, sealing projections that are partly bonded to said back surface of the retroreflective element so that said prismatic projections are confined while the surfaces of the prismatic projections have interfaces with an air and a form a plurality of sealed cells, and an electroluminescence device which has a substantially flat light-emitting surface extending substantially the whole area of the back surface of said lining film, wherein said sheet further comprises a light-transmitting contact layer which fills depressions formed by the embossing on the back surface of the lining film and is bonded to substantially the whole area of the back surface of the lining film, and also to substantially the whole area of the light-emitting surface of the electroluminescence element.

2. The self light-emitting retroreflective sheet according to claim 1 wherein the light-transmitting retroreflective element has a light transmission of at least 70%.

3. The self light-emitting retroreflective sheet according to claim 1 wherein the lining film has a light transmission of at least 20%.

4. The self light-emitting retroreflective sheet according to claim 1 wherein the contact layer has a light transmission of at least 30%.

5. The self light-emitting retroreflective sheet according to claim 1 further comprising a protective film on the substantially flat surface of the light-transmitting retroreflective element.

6. The self light-emitting retroreflective sheet according to claim 1 wherein the sealing projections that are partly bonded to said back surface of the retroreflective element form an adhesion area of about 10% to about 85% of the whole back surface of the retroreflective element.

7. A method for producing a self light-emitting sheet as claimed in claim 1, which comprises the steps of:

placing a resin film which is a precursor of the lining film with its surface facing the back surface of the retroreflective element with leaving a specific distance from the back surface of the retroreflective element;

embossing said resin film from its back surface to protrude its surface partly and form sealing projections which bond to the back surface of said retroreflective element, whereby the retroreflective member having a plurality of sealed spaces is formed;

forming a coated layer having a substantially flat liquid surface by applying a polymerizable liquid onto the back surface of said lining film and filling the depressions formed by embossing;

polymerizing said coating liquid and forming a contact layer having the substantially flat surface which is formed from said substantially flat liquid surface and bonded to said lining film, and placing an electroluminescence element on the substantially flat surface of the contact layer so that its light-emitting surface is in contact with the contact layer.

8. The self light-emitting retroreflective sheet according to claim 1, wherein the electroluminescence device comprises a transparent conductive layer, a luminescent layer having a support layer, luminescent particle layer, and insulating layer, and a rear electrode laminated in this order on the flat surface of the light-transmitting contact layer.

* * * * *